United States Patent [19]

Kato

[11] 4,265,940
[45] May 5, 1981

[54] PRESSURE APPLYING ROLLERS FOR INSTANT PHOTOGRAPHIC CAMERAS AND METHOD OF PRODUCING THE SAME

[75] Inventor: Kenichi Kato, Sano, Japan

[73] Assignees: Fuji Photo Optical Co., Ltd.; Sano Kiko Co., Ltd., both of Japan

[21] Appl. No.: 63,459

[22] Filed: Aug. 3, 1979

Related U.S. Application Data

[63] Continuation-in-part of Ser. No. 890,918, Jun. 23, 1978, abandoned.

[30] Foreign Application Priority Data

Apr. 4, 1977 [JP] Japan .................................. 52-38224

[51] Int. Cl.³ ................................................ C23C 3/02
[52] U.S. Cl. .................................. 427/292; 427/383.7; 427/438
[58] Field of Search ...................... 29/130, 132, 121.8; 427/292, 438, 435, 436, 383.7; 204/25, 49; 354/202, 86; 428/679

[56] References Cited

U.S. PATENT DOCUMENTS

| 3,647,646 | 3/1972 | Tucker et al. | 204/25 |
| 3,756,760 | 9/1973 | McBride | 29/132 X |
| 3,857,733 | 12/1974 | Arnold | 427/438 |
| 3,903,319 | 9/1975 | El-Mohamad | 427/438 |

OTHER PUBLICATIONS

Symposium on Electroless Nickel Plating, ASTM Technical Publication, No. 265 (1959), pp. 37, 44, 45.
Domnikov, Hardness of Electroless Nickel Deposits, Metal Finishing, Feb. 1961, pp. 52-54.

*Primary Examiner*—Ralph S. Kendall

[57] ABSTRACT

A roller of the type useable as either of the pair of pressure applying rollers used in an instant photographic camera wherein a film unit consisting of a photosensitive element, an image receiving element and a rupturable pod containing a processing fluid is passed between a pair of pressure applying rollers which apply compressive pressure to the film unit so as to rupture the pod and dispenses the processing fluid between and in contact with the photosensitive element and the image receiving element to initiate a diffusion transfer process. The roller has a round roller body having fine surface irregularities and a plated layer of nickel which is reduction separated on the surface of the roller by using the roller material as a catalyst. The plated layer separated on the surface of the roller is of uniform thickness. The roller may be heat hardened after the nickel layer is reduction separated.

2 Claims, 1 Drawing Figure

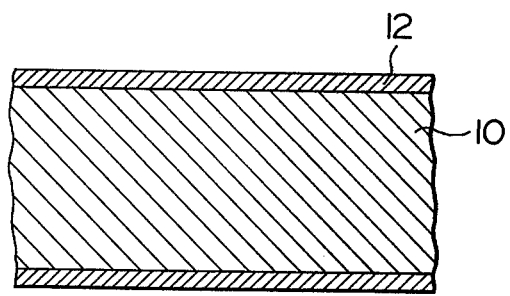

PRESSURE APPLYING ROLLERS FOR INSTANT PHOTOGRAPHIC CAMERAS AND METHOD OF PRODUCING THE SAME

This is a continuation-in-part of application Ser. No. 890,918, filed June 23, 1978, abandoned.

BACKGROUND OF THE INVENTION

1. Field of the Invention

This invention relates to a roller of the type useable as either of the pair of pressure applying rollers adapted to apply compressive pressure to a film unit when it is advanced therebetween in a self-development type photographic camera, and more particularly to an improvement in a roller of such type. The self-development type camera uses a film unit including a photosensitive element, an image receiving element and a rupturable pod containing therein a processing fluid which is ruptured so as to dispense a processing fluid between and in contact with the photosensitive element and the image receiving element and initiate the diffusion transfer process to conduct the development immediately after exposure of the film unit.

This invention further relates to a method of producing an improved roller of such type.

2. Description of the Prior Art

The self-development type camera (hereinafter referred to as an instant photographic camera) is well known in the art. Recently, it is well known to use a so-called mono-sheet type film unit as described above instead of the conventional peel-apart type film unit. The mono-sheet type film unit has a pod containing therein a processing fluid which is ruptured by a pair of pressure applying rollers when it is advanced therebetween. The pressure applying rollers serve both to rupture the pod and to distribute the processing fluid between and in contact with the photosensitive element and the image receiving element to initiate the diffusion transfer process.

The pair of pressure applying rollers used in the instant photographic camera is a very important element from the viewpoint of its function to uniformly distribute the processing fluid over the whole area of the photosensitive element and the image receiving element. Further, the pair of pressure applying rollers has the functions of nipping the film unit, firmly feeding the film unit therebetween and applying compressive pressure uniformly thereto. Therefore, the performance of the pair of pressure applying rollers determines the quality of the visible image which is finally obtained. Among the various functions of the pair of pressure applying rollers, the most important is to uniformly apply compressive pressure to the film unit. More specifically, the pair of pressure applying rollers must form a layer of the processing fluid of uniform thickness between the photosensitive element and the image receiving element, impart a uniform compressive pressure to the film unit over the length thereof, and feed the film unit at a uniform speed over the length thereof. Although these functions are of course affected by various factors relating to elements other than the rollers such as the shape of the film unit and the balance between the forces applied to the opposite ends of the pair of rollers, these functions are most strongly influenced by the shape of the rollers. For instance, even if the opposite ends of the pair of pressure applying rollers are imparted with balanced forces, uniform pressure will not be applied to the film unit if the rollers do not have a sufficiently high dimensional accuracy, i.e. sufficiently controlled roundness, sufficiently controlled straightness and sufficiently high cylindricity. The accuracy required to satisfy the above conditions is, for instance, such that the allowable error in outer diameter is about $\pm 2\%$, and the allowable deviation from roundness, straightness and cylindricity is about $\pm 3\mu$.

Furthermore, the surface of the rollers is desired to have a proper roughness to satisfactorily nip the film unit and feed the film unit at a constant speed by friction. The lack of sufficient friction between the surface of the rollers and the film unit will result in a failure in nipping and in slippage in the feeding of the film unit, which will deteriorate the quality of the image finally obtained. Further, if the surface of the rollers becomes abraded during the use thereof, similar troubles will arise. Therefore, the conventional rollers have fine surface irregularities on the roller body. Besides, the rollers have a hardened surface layer to protect the fine surface irregularities from abrasion. The hardened surface is made by a carburizing and quenching process, and the protective layer is made by an electroplating process. By the carburizing and quenching process, the surface is hardened to a hardness of Vickers hardness of Hv700 to 800.

Difficulties are incurred in the manufacturing process of the above described conventional roller, and accordingly the cost thereof is considerably high. The conventional manufacturing process will hereinbelow be described in detail in conjunction with the problems inherent therein.

The process of manufacturing the roller comprises the following steps:

(1) a roller body of a predetermined dimension is made by turning and finishing a round free-cutting steel;

(2) fine surface irregularities are formed on the surface of the roller body by sand blasting;

(3) the surface of the roller is given a carburizing and quenching treatment;

(4) an anti-corrosion layer is formed on the roller by electroplating thereon a metallic material such as nickel.

In the above described process, no problems are encountered in the first and second steps, but following difficulties arise in the third and fourth steps:

(a) deformation strain arising from the carburizing and quenching treatment causes a deviation from straightness.

Free-cutting steel is not sufficiently hard and accordingly a hardening process is necessary. As the hardening process, carburizing is preferred. However, the temperature at which carburizing is conducted is generally as high as 880° to 920° C. Such a high temperature will result in deformation strain in the roller. The strain causes a marked deviation from straightness and it is very difficult to control the deviation within the allowable range. Further, since the roller is provided with fine surface irregularities before it is carburized, it is impossible to additionally process the roller after the carburizing process to correct the deviation from straightness. In addition, if the roller is additionally processed after the carburizing process, the diameter of the roller will be changed and it will become difficult to maintain the diameter within the allowable range of diameter. It is also not only difficult but also disadvantageous from a technical viewpoint to process the carburized and quenched roller by turning or sand blasting. Therefore, in the practical manufacturing process, the rollers are subjected to a severe inspection between the third step and the fourth step so that only good rollers having dimensions within a predetermined range are passed for processing in the fourth step. Thus, the yield is very low and accordingly the cost of the roller is markedly high.

(b) Electroplated layer adversely affects the fine surface irregularities.

As is well known in the art, it is very difficult to form an electroplated layer of uniform thickness on a rough surface or surface having fine surface irregularities. Particularly, the electroplated layer on the protruding portions becomes thick and the adhesive force thereof is as weak as 9 Kg/mm$^2$. It is almost impossible to control the thickness of the plated layer on the roller to make it uniform over the irregular surface. Therefore, it is impossible to faithfully reproduce the surface irregularities of the roller in the electroplating process. Consequently, the surface of the roller cannot be given a perfectly uniform hardness distribution and, as a result, partial abrasion of the surface of the roller occurs in the course of use. Also, disadvantageously, acute projections in the plated layer will scratch the surface of the film unit when the film is fed by the pair of rollers. Thus, the partial abrasion and the acute projections on the surface of the roller markedly lower the quality of the photographic image obtained on the film unit. Further, in electroplating it is impossible to make a plated layer which is completely free of pores. Particularly in case of a roller provided with the surface irregularities by sand blasting, the plated layer inevitably has pores. Pores in the plated layer make the surface of the roller susceptible to rusting.

As described in detail hereinabove, the conventional rollers used in the pair of pressure applying rollers in the instant photographic camera have a defect in that the control of the dimensional accuracy is very difficult and accordingly the yield in the manufacturing thereof is very low and the cost is accordingly considerably high.

SUMMARY OF THE INVENTION

It is, therefore, the primary object of the present invention to provide a roller of the type used for the pressure applying rollers in an instant photographic camera which has high dimensional accuracy and can be manufactured at low cost.

Another object of the present invention is to provide a roller of said type which has high performance.

Still another object of the present invention is to provide a roller of said type which has high durability.

A further object of the present invention is to provide a method of producing a roller of said type by which rollers of high performance can be manufactured at high yield and accordingly at low cost.

The above objects of the present invention are accomplished by eliminating the carburizing and quenching process from the roller manufacturing process and forming a plated layer of nickel on the roller by reduction separation using the roller itself as a catalyst. Further, when required the roller plated with nickel is hardened at a proper temperature of about 200° to 400° C. The plated layer of nickel has a thickness of 5 to 12μ.

The method of producing the roller in accordance with the present invention can be summarized as comprising the following four steps:

(1) making a roller body meeting predetermined requirements for roundness and straightness by turning and finishing a round steel;

(2) forming fine surface irregularities on the surface of the roller body by sand blasting or the like;

(3) forming a plated layer of nickel on the roller body to a thickness of 5 to 12μ by reduction separation using the roller itself as a catalyst;

(4) optionally hardening the roller covered with the nickel plated layer at a proper temperature of about 200° to 400° C.

BRIEF DESCRIPTION OF THE DRAWING

The FIGURE is a longitudinal sectional view of a portion of a pressure applying roller for an instant photographic camera in accordance with this invention.

DETAILED DESCRIPTION OF THE INVENTION

In the above process, the first and second steps are well known in the art, and accordingly, a detailed description thereof is omitted here. Hence, only the third step of forming a plated layer 12 of nickel on a roller body 10 and the fourth step of hardening the roller will be described in detail hereinbelow.

The third step of forming a plated layer of nickel on the roller is a chemical plating process in which the roller body 10 is a material belonging to the eighth group of the periodical table which itself acts as a catalyst in the reduction separation of nickel on the surface of the roller. By controlling the duration of the chemical plating process, the thickness of the plated layer 12 of nickel can be controlled. Such a chemical plating process for reduction separation of a metal has been introduced by the General American Transportation Company (GATX) and is well known as the Catalytic Nickel Generation process.

The plated layer of nickel thus formed has the following advantages:

(a) The hardness is as high as about Hv500.

(b) The thickness is uniform regardless of the state of the surface to which it is plated, and accordingly the fine surface irregularities are faithfully reproduced.

(c) No pores are formed, and accordingly it has high anti-corrosion property.

(d) The adhesion is as high as about 24 Kg/mm$^2$.

(e) The thickness can easily be controlled by controlling the processing time.

The roller produced in accordance with the present invention may further be hardened by the above fourth step in which the roller is subjected to a heat hardening treatment. By the fourth step, the hardness of about Hv500 is enhanced to about Hv580 in case of heat treatment at 200° C. and to about Hv760 in case of heat treatment at 300° C. At these temperatures the roller is not deformed and no strain appears.

The roller in accordance with the present invention produced as described hereinabove is advantageous in that it has a pore-free plated layer having a uniform thickness and accordingly it has desirable surface irregularities and high anti-corrosion property. Further, since the roller is not subjected to a carburizing process, it has high dimensional accuracy and is almost free of deviations from roundness, straightness and cylindricity.

Furthermore, since the roller is not subjected to carburizing and electroplating processes, the yield is high (substantially 100%) and accordingly the cost of the roller can be markedly lowered so that the price of the instant photographic cameras employing the pressure applying rollers can also be lowered.

In addition, the method of producing the roller in accordance with the present invention is advantageous in that the thickness of the plated layer can be easily and accurately controlled. The degree of accuracy in the thickness of the plated layer is about ±0.6 to 1μ when the thickness of the plated layer is between 5 to 12μ regardless of the degree of roughness of the surface of the roller.

I claim:

1. A method of producing a roller of the type useable as either one of a pair of pressure applying rollers adapted to be used in an instant photographic camera, said method comprising the steps of:

making a roller body having predetermined dimensions, forming fine surface irregularities on the surface of said roller body, and thereafter electroless depositing nickel by reduction separation on the surface of said roller body to form a plated layer of nickel of uniform thickness thereon using the roller itself as a catalyst, whereby said roller is produced without hardening the roller body per se before it is plated, and heat hardening the plated layer on the surface of the roller.

2. A method of producing a roller as defined in claim 1 wherein said step of heat hardening the roller is conducted by heating the plated layer to a temperature between 200° and 300° C.

* * * * *